(12) United States Patent
Beach

(10) Patent No.: US 7,126,945 B2
(45) Date of Patent: Oct. 24, 2006

(54) POWER SAVING FUNCTION FOR WIRELESS LANS: METHODS, SYSTEM AND PROGRAM PRODUCTS

(75) Inventor: Robert Beach, Los Altos, CA (US)

(73) Assignee: Symbol Technologies, Inc., Holtsville, NY (US)

( * ) Notice: Subject to any disclaimer, the term of this patent is extended or adjusted under 35 U.S.C. 154(b) by 1043 days.

(21) Appl. No.: 09/986,054

(22) Filed: Nov. 7, 2001

(65) Prior Publication Data

US 2003/0086443 A1   May 8, 2003

(51) Int. Cl.
*H04J 3/24* (2006.01)
(52) U.S. Cl. .................. 370/389; 370/311
(58) Field of Classification Search ........... 370/230, 370/256, 312, 313, 328, 331, 336, 338, 401, 370/412, 447, 310, 311, 318, 320, 324, 333, 370/335, 342, 346, 347, 350, 349, 465, 402, 370/389, 428, 480, 449, 390, 216, 200, 202, 370/334, 341; 455/436, 439, 422, 432, 433, 455/38.3, 38.2, 515, 522
See application file for complete search history.

(56) References Cited

U.S. PATENT DOCUMENTS

| | | | | |
|---|---|---|---|---|
| 5,465,392 | A | 11/1995 | Baptist et al. | 455/38.3 |
| 6,002,918 | A | 12/1999 | Heiman et al. | 455/38.3 |
| 6,067,297 | A * | 5/2000 | Beach | 370/389 |
| 6,188,681 | B1 | 2/2001 | Vesuna | 370/338 |
| 6,192,230 | B1 | 2/2001 | van Bokhorst et al. | 455/343 |

FOREIGN PATENT DOCUMENTS

| | | |
|---|---|---|
| EP | 0 615 364 B1 | 2/1994 |
| EP | 0 907 262 A2 | 9/1998 |
| EP | 0 907 262 A3 | 9/1998 |
| EP | 1 111 895 A2 | 12/2000 |
| EP | 1 111 895 A3 | 12/2000 |

OTHER PUBLICATIONS

European Search Report EP 02 006803 dated Oct. 31, 2003.
XP-002258349; Feigin et al., "Hardware-Fitted Modeling and Simulation of VoIP over a Wireless Lan," *IEEE Communications* (2000) pp. 1431-1438.

(Continued)

*Primary Examiner*—Ajit Patel
(74) *Attorney, Agent, or Firm*—Williams, Morgan & Amerson, P.C.

(57) ABSTRACT

A wireless data communication system has a first station or mobile unit is linked to a second station configured as an access unit to support packet communication, voice or data, where the voice packets are transmitted in the Continuously Aware Mode (CAM) mode while other packets are buffered by the access point and held until asked for by the first station when in a Power Saving-Poll (PSP) mode. A monitoring apparatus at the access point monitors all transmitted packets and sorts the packets to the mobile unit according to CAM or PSP mode. Voice packets are sent out immediately to the mobile unit. Other packets are stored at the access point. The packet arrival rate may vary during transmission and due to random packet delays introduced by propagation characteristic and processing apparatus. The packet arrival rate and delays are taken into account by the first station in an algorithm to determine and extend the normal safe period in which the station receiver may be powered off.

18 Claims, 3 Drawing Sheets

OTHER PUBLICATIONS

XP-002258350; Shirdokar et al, "A QoS-Based Indoor Wireless Data Network Design for VoIP Applications," *IEEE Communications* (2001) pp. 2594-2598.

XP-002258351; Liu et al., "Packet Telephony Support for the IEEE 802.11 Wireless LAN," *IEEE Communications Letters*, vol. 4, No. 9, Sep., 2000.

http://computer.org/students/looking/summer97/ieee802.htm, *A Short Tutorial on Wireless LANs and IEEE 802.11*, Lough et al., The Bradley Dept. of Electrical and Computer Engineering, Virginia Polytechnic Institute and State University, pp. 1-5 (Jun. 15, 2001).

http://www.csdmag.com/main/feat9709.htm, *An IEEE 802.11 WLAN Primer*, B. Tuch, pp. 1-10 (Jun. 15, 2001).

*Wireless and Mobile Network Architectures* by Y. Lin et al., published by John Wiley and Sons, NY, NY, 2001 (ISBN 0471-39492-0), Chapter 16.

*IEEE 802.11 Handbook—A Designer's Companion* by V. O'Hara and A. Petrick published by the Institute of Electrical and Electronic Engineers, NY, NY 1999 (ISBN 0-7381-1855-9), Chapter 8.

*Wireless LANS: Implementing Interoperable Networks*, by J. Gier, published by MacMillian Technical Publishing (ISBN 1-57870-081-7) 1999, Chapter 4.

\* cited by examiner

POWER SAVING FUNCTION FOR WIRELESS LANS: METHODS, SYSTEM AND PROGRAM PRODUCTS

BACKGROUND OF INVENTION

1. Field of Invention

This invention relates to wireless communication networks, methods of operation and program products. More particularly, the invention relates to an improved power saving function for wireless LANs: methods, system and program products.

2. Description of Prior Art

In the current IEEE 802.11 specification, Voice Over Internet Protocol (VoIP) telephones and other multimedia devices operate in two power modes: Active or Continuously Aware Mode (CAM) where the mobile listens for traffic and Sleep or Power Saving Mode (PSM) where the mobile remains in a transmit only standby mode. The mobile unit is either exclusively in one or the other. One operating problem is that the telephones must leave their radios in receive mode during the entire duration of the phone call because non voice packets addressed to the telephone may arrive at any time. Such packets could contain data messages terminating the call or for other data applications running on the phone. The messages cannot be dropped. The phone cannot operate in PSM mode because the latency introduced in such a mode is too long to maintain acceptable voice delay. Thus, considerable power consumption takes place during the receive mode.

When a call is established on a VoIP telephones the unit transmits and receives packets containing compressed digitized voice (or possibly video). These packets are quite small (~100 bytes or so) and are sent and received on a periodic basis. For typical VoIP calls using G.729 compression, a 120 byte packet is sent and/or received every 20 to 40 ms. Even at IM bit, the duration of these packets on the air is less than IMs. At higher data rates the duration is even less. It would be desirable if the power could be turned off from the receive unit during the intervals between voice packets since the receiver knows that the next voice packet will not appear prior to some fixed interval. In such a case, the receiver would be powered off up to 90% of the time and would result in dramatic power savings. In current and future devices, the power consumption of the WLAN radio, even in receive mode, is much greater than other digital circuitry such as DSPs and Codecs and hence the savings would occur even though the digital circuitry would still be active. It would be an advance in the art to further improve the power saving capacity of mobile and terminal units in wireless communication networks.

Prior art related to power saving in wireless communication network includes:

(A) U.S. Pat. No. 5,465,321, issued Nov. 7, 1995 discloses a wireless local area network system including a server and a plurality of mobile wireless stations, the server maintains a table of stations active in the network system and monitors the transmission activity of the stations. If no activity is detected from a station for a predetermined time, a series of watchdog messages is sent requesting a response from that station. The stations are battery powered and operate in an "AWAKE" state to receive or transmit messages or in a SLEEP state of low power consumption. The stations return from the SLEEP state to the AWAKE state in time to receive at least one watchdog message, thereby avoiding the stations being undesirably logged out from the table of active stations.

(B) U.S. Pat. No. 6,002,918, issued Dec. 14, 1999 discloses a communications network comprising a cellular local area wireless network includes a plurality of access points connected to a housed computer and each other, and a plurality of mobile units each mobile unit being arranged for association with an access point. The mobile units are arranged to periodically scan for and identify the most eligible access point for association on the basis of the criteria of best quality signal strength and loading factor. In order to identify when mobile units are being removed from a predetermined area, access points having directional antennae are situated adjacent exit points to detect when mobile units are in vicinity. Each mobile unit may include paging facilities, including the capability of transmitting information in a coded form known both to the unit and to a host, and power-saving facilities (C) U.S. Pat. No. 6,067,297, issued May 23, 2000 discloses a wireless communication system, in particular a wireless LAN includes at least two mobile units, one of the mobile units including an adapter card configured to support embedded access point capability and including an association table for retaining status information concerning other mobile units in the network and message transmit queues allowing the system to operate in power saving polling mode. According to another aspect the invention relates to a wireless communication system including roaming mobile units wherein, when a mobile unit roams from a first access point to a second access point, the first access point only becomes aware of the roam once the mobile unit has transmitted a packet on to the backbone.

None of the prior art discloses a mobile receiver in an IEEE 802.1 wireless local area network (WLAN) operating in a CAM and a PSM concurrently, and experiencing the low latency that is a benefit of the CAM mode while enjoying the power savings benefit of the PSM

SUMMARY OF INVENTION

A wireless data communication system has an improved power saving function enabling concurrent operation of the system in a Continuously Aware Mode (CAM) and in an extended Power Saving Mode (PSM). A first station or mobile unit is linked to a second station configured as an access unit to support packet communication, voice or data, where the voice packets are transmitted in the CAM mode while other packets are buffered by the access point and held until asked for by the first station when in a power saving mode (PSM). A monitoring apparatus at the access point monitors all transmitted packets and sorts the packets to the station according to CAM or PSM modes. Voice packets are sent out to the station. Other packets are stored at the access point. The packet arrival rate may vary from the transmitted rate due to random packet delays introduced by propagation characteristic and processing apparatus. The packet delays are taken into account by the first station in an algorithm to determine and extend the normal safe period in which the receiver may be powered off. The algorithm comprises the Steps of: (a) comparing the ith actual packet arrival time [AI(i)] to P or expected arrival time; (b) if approximate or "Yes", determine the state of the Voice PSP Mode as "0" or disabled or "1", enabled but in trouble or "2", enabled; (c) if "0", calculate the Power Off time between packets as [P−Standard Deviation of consecutive packet arrival time AI (i, i+1, i+2)−Receiver Stabilizing time after power on] and after calculating wait for the next packet; (d) if the Voice PSP mode is "1" or "2" wait for the arrival of the next packet; if (b) is "No", determining the state of the VSP mode as "0", "1", or "2"; if "0" wait for the next packet; or if "1" with the VSP mode disabled and good packet intervals are "0" then wait for the next packet arrival and if "2" with VSP mode enabled then reduce Power Off time by slight amount. A loss of a voice packet will cause the station to return to the full time receive mode and the algorithm will start again to determine the delay and adjust the power off period accordingly.

BRIEF DESCRIPTION OF DRAWINGS

The invention will be further understood from the following detailed description of a preferred embodiment taken in conjunction with an appended drawing, in which.

DESCRIPTION OF PREFERRED EMBODIMENT

Figure 1:
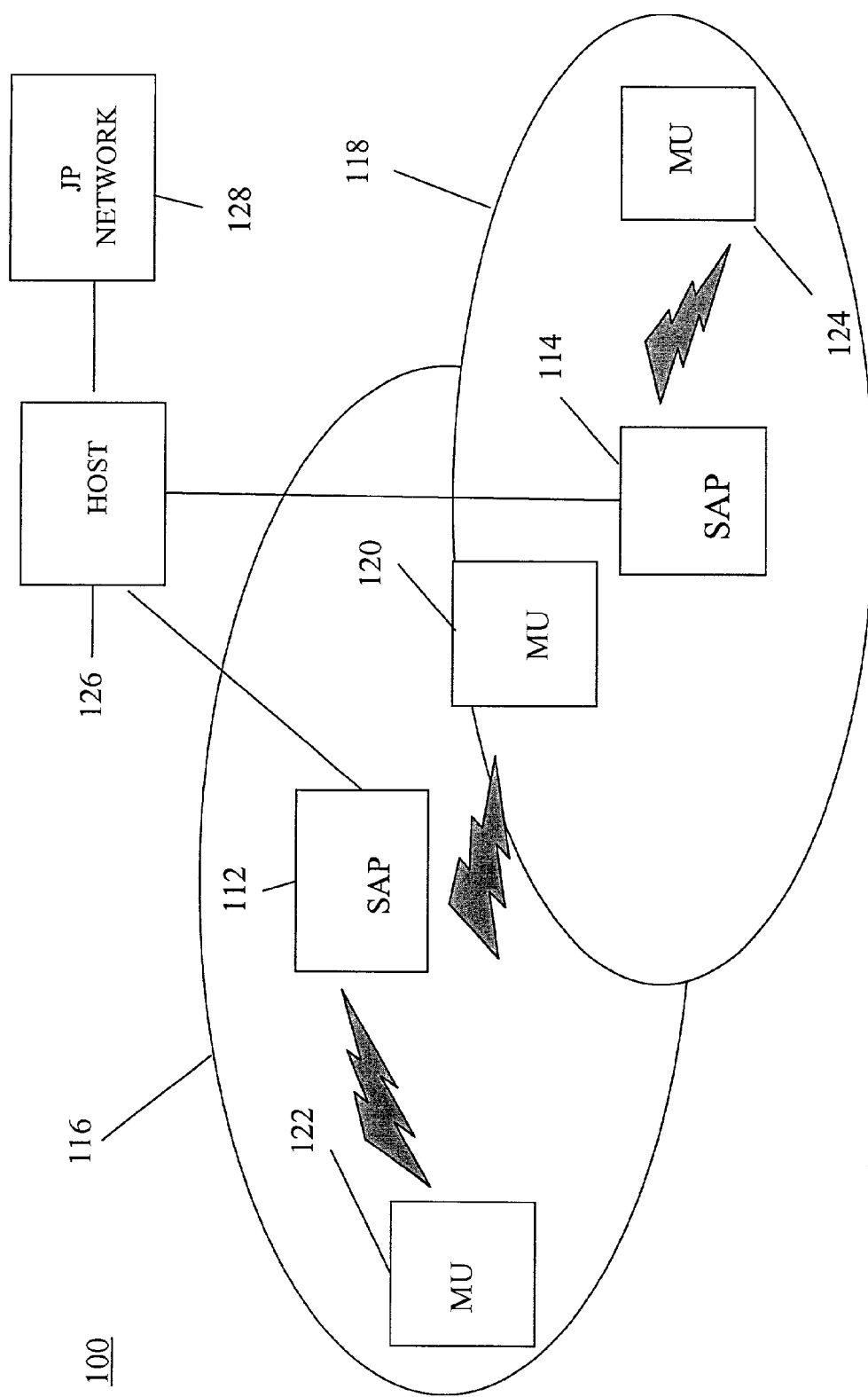
FIG. 1 is a representation of a wireless Local Area Network implementing IEEE 802.11 VoIP communication protocol and incorporating the principles of the present invention.

In FIG. 1, a wireless LAN 100 includes stationery access points (SAPs) 112, 114 within geographical areas 116 and 118 sending messages to and receiving messages from stations or mobile units (MUs) 120, 122 and 124. The 802.11 standard defines access points as addressable stations, providing an interface to the distribution system for stations within a geographic area. The access points are connected to a host 126, typically a PBX or the regular telephone system which is in turn linked to an IP network 128 enabling stations to communicate with users served by the IP network. A description of a mobile network interacting with an IP network is described in the text *Wireless and Mobile Network Architectures* by Y. Lin et al., published by John Wiley and Sons, NY, N.Y. 2001 (IBN0471-39492-0), Chapter 16 which is fully incorporated herein by reference.

The IEEE 802.11 defines the standards for wireless local area networks, the details of which are described in the text *IEEE 802.11 Handbook—A Designer's Companion* by V. O'Hara and A. Petrick, published by the Institute of Electrical and Electronic Engineers, NY, N.Y. 1999 (ISBNO-7381-1855-9), Chapter 8 which is fully incorporated herein by reference, and the text *Wireless LANS: Implementing Interoperable Networks*, by J. Gier, published by MacMillian Technical Publishing (ISBN1-57870-081-7) 1999, Chapter 4 fully incorporated herein by reference. The 802.11 power management function sets access points and radios to power save modes using installed initialization routines. The access points maintain a record of mobile units currently working in power save mode by monitoring a frame control field in a MAC header sent on the network. The access points buffer packets addressed to the mobile unit and forward the buffered packets to the applicable mobile unit when it returns to an active state or when a mobile unit requests the packets. The access points know when a mobile unit is awake because the unit will indicate an active state by toggling a power management byte in a frame control field of a MAC frame. A mobile unit can discover that frames have been buffered at the access point by listening to beacons sent periodically by the access points. The beacons will have a Traffic Indication Map (TIM) of stations having buffered frames at the access points. A station uses a Power Save-Pole (PSP) frame to notify the access point to send the buffered packet. Further details of the operations of wireless LANs are described in the text *Wireless LANS: Implementing Interoperable Networks*, supra.

Having described the basics of wireless local area networks operating under IEEE 802.11 protocol, it is believed appropriate to provide an overview of the invention before describing the details of the power saving function.

In FIG. 1, the access points (SAP) 112, 114 sort traffic addressed to the stations or mobile units (Mus) 120, 122, 124 into two basic categories: that which must be sent out immediately and that which can be held until asked for by the MU. There are several different algorithms by which this sort can be done. The algorithms can be based on IEEE 802.1p/q priority tags/levels, or based upon particular combinations of MAC, IP, UDP, and/or TCP addressing, or based upon contents of various fields within the packet, or based on any combination of these methods. The basic goal is to divide the traffic into the two categories. Once this has been done the SAP sends the packets as follows: Data that must be sent out immediately is done so exactly as the SAP treats current data when the MU is in a Continuously Aware Mode. Data that can be buffered is treated exactly as the SAP treats data when the MU is in the other or Power Saving Mode (that is, a bit is set in the TIM field of beacons and the MU polls for the data when it decides it wants the data). In this model, voice packets would be treated as CAM packets and sent out immediately. All other packets would be treated as PSM packets.

If the MU knows the SAP is handling data to it in such a way, the MU can now take advantage of the periodic nature of voice traffic. The non-CAM packets are fetched from the SAP via the regular Power Saving Poll (PSP) algorithm at intervals decided by the MU. For CAM packets, the MU includes measurement apparatus (not shown) which measures the interval between CAM packets and calculates a safe period for turning off the receiver during the intervals between expected voice packets without worrying that it will lose important data packets. When in the Power Saving or "Sleep" mode the measuring apparatus can also determine when the MU can awake based on the expected packet arrival time without listening for beacons or other 802.11 concepts.

An important element of such a model is the algorithm by which the MU decides when and for how long to power off the receiver during voice transfers. Although the voices are transmitted at regular intervals, the network will introduce random delays so that the arrival rate may vary somewhat from the transmitted rate. These delays will vary from packet to packet but over the long run, the transmitted and received rates will be the same. The MU must estimate the ""jitter"" in the arrival rate so as to arrive at the optimum power off time for the receiver. Too long of value will result in packets being lost. To short of value will result in excessive power consumption. The measuring apparatus takes into account the "jitter" associated with the arriving packets in determining the safe period for turning off the receiver. There are a number of possible algorithms for determining the safe period.

Figure 2:
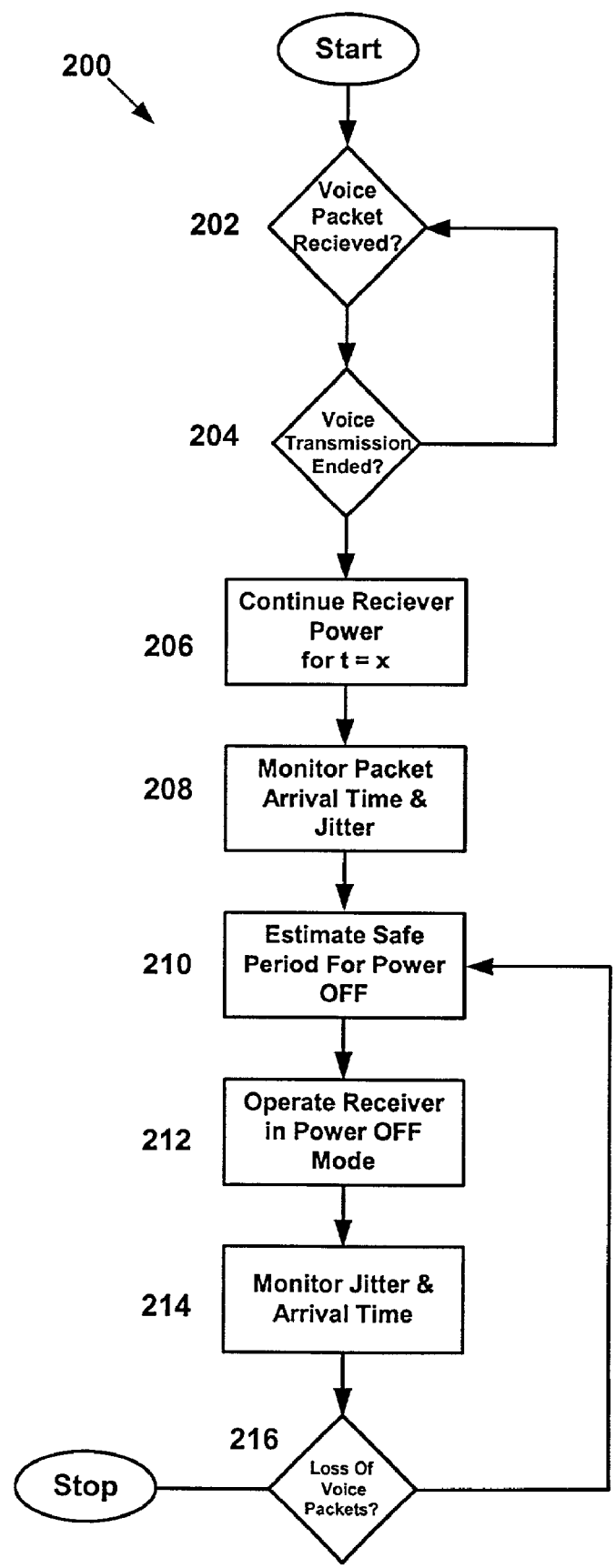
FIG. 2 is a flow diagram implementing one method of adjusting the power saving function of the system of FIG. 1.

In one embodiment, shown in FIG. 2, a process 200 is entered in Step 202 after the MU has not received a number of voice packets or following the cessation of voice transmissions in Step 204. The phone will not power off the receiver for a period of time "X" in Step 206 where "X" is based upon the expected interval of the voice packets. The MU will know from the call setup process, the expected arrival interval between voice packets and in Step 208 will initially monitor the actual arrival time and the associated interpacket ""jitter"". After receiving some number of packets in Step 210, the MU will make an estimate of a safe period in which the receiver can be powered off based upon a statistical analysis of packet arrival times. The period will be such that the receiver would have been able to hear packets with any measured arrival rate "jitter". There will also be some built-in safe factor. In Step 212, once the MU has begun to operate in a receiver power off mode, the MU will continue to monitor the arrival "jitter" in Step 214 and will adjust the power off period as needed in Step 210. A loss of voice packets in Step 216 will cause the MU to go back to a full time receive mode and the process will start again in Step 202, otherwise the process returns to Step 210 to adjust the safe period according to the monitored "jitter" time in Step 208 The process 200 will work much better if silence suppression is not used by either party in the call.

Figure 3:
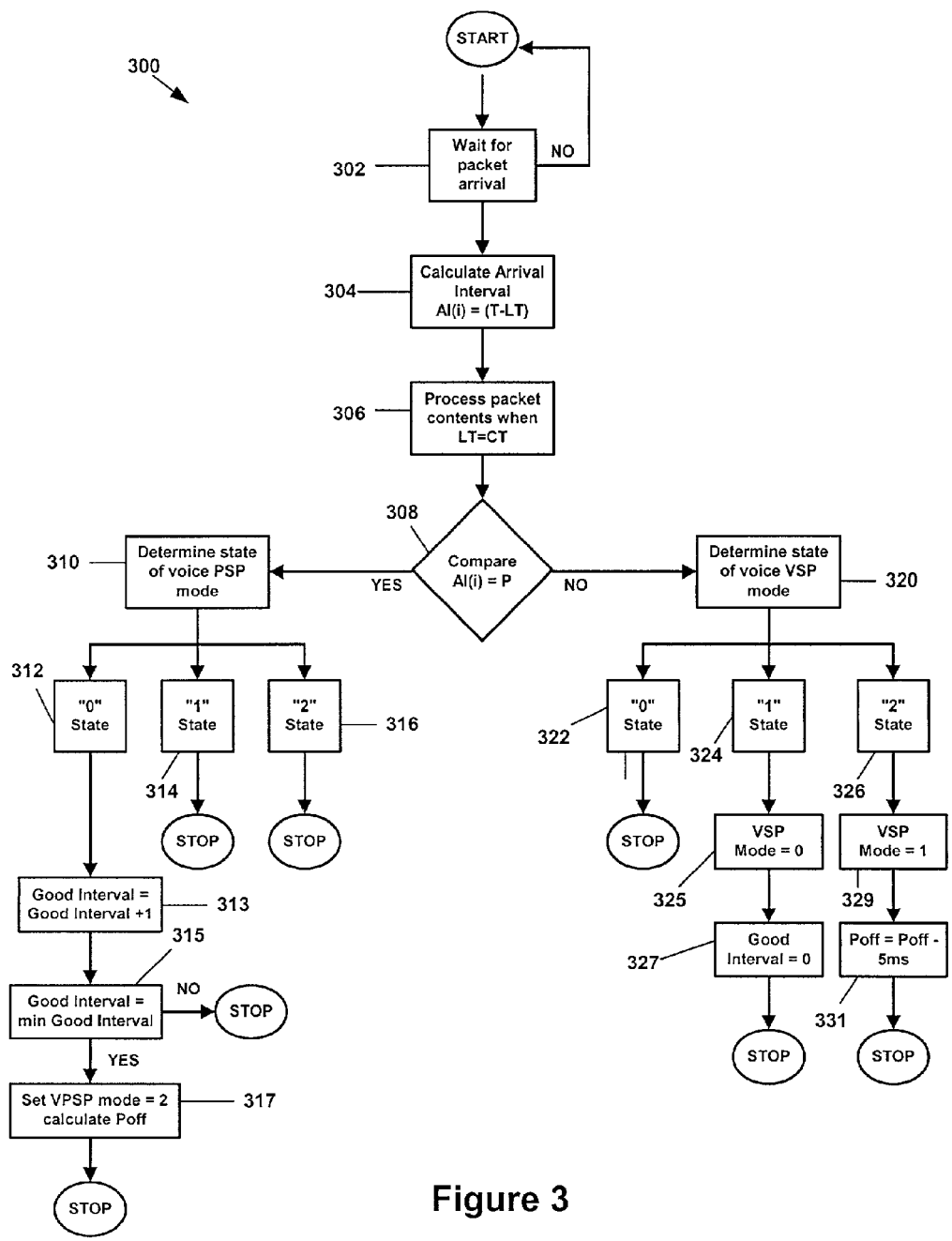
FIG. 3 is a flow diagram implementing an alternative method of adjusting the power saving function of the system of FIG. 1.

In another embodiment shown in FIG. 3, a process 300 is entered when conditions (A), (B), and (C) are in place where: (A) is LT, the time when the last packet arrived, equals CT, the current time in ms; (B) the VoicePSPMode (VSP) equals "0" or disabled; or "1" enabled but in possible trouble; or "2" enabled and (C) the Goodinterval has the number of consecutive packets arrive in which AT (n) the last "n" packet arrival intervals where "n" equaled 3–4 is proportional to P, the expected packet arrival interval. Table 1 lists the parameters and their definition in the process 300, as follows:

TABLE I

Constants for PSP-voice Algorithm

A) Constants for PSP-voice Algorithm:
  1) P: expected packet arrival interval.
  2) minGoodIntervals: minimum number of Goodintervals required before going into PSP-voice mode.
  3) RSUTime: the time that the radio needs to stabilize after the power is applied.
B) Variables for PSP-voice Algorithm:
  1) CT: current time in ms based on a system timer
  2) LT: time when last packet arrived.
  3) AT (n): last "n" actual packet arrival intervals where "n" is typically 3–4.
  4) "i": current packet number.
  5) GoodIntervals: number of consecutive packets in AT (i)~P.
  6) VoicePSPMode (VSP): "0" = disabled; "1" enabled but may be in trouble, and "2" enabled.
  7) P offTime: the time that the radio will be powered off (always less than P).

After entrance into the process 300, Step 301 waits for the next packet arrival. Step 304 calculates the arrival interval for the ith packet. Step 306 processes the packet contents when LT=CT. In Step 308, the ith packet arrival time [AI] is compared to P for expected arrival time. If the ith actual packet arrival time is approximate to the expected arrival time, Step 310 determines the state of the voice PSP mode as "0" in Step 312; or "disabled" or "1" enabled, but in troubled in Step 314 or "2" or enabled in Step 316.

In Step 312, the good intervals are incremented by +1 in Step 313. The good intervals are compared to the minimum good intervals in Step 315. If "No", the process returns to Start (S). If "Yes", the VoicePSPmode is set to "2" in Step 317 and the power off time calculated using the equation [P−standard deviation of consecutive packet arrival time I (i, i+1, i+2)−RSU or receivers stabilizing time after power on) and the process returns to Start.

If the voice PSP mode is "1" or "2", in Step 314 or 316, the process returns to Start (S) and waits for the arrival of the next packet.

Returning to Step 308, if the voice PSP mode is "No", then in Step 320 the state of the VSP mode is determined as "0" in Step 322, "1" in Step 324, or "2" in Step 326. If the VSP mode is "0" in Step 322, the process returns to Start (S) and waits for the next packet.

In Step 324, if the VSP mode is "1", Step 325 determines if the state of the VSP mode is "0" and the Goodintervals equals "0" in step 327 whereupon the process returns to Start.

If the VSP mode is "2" or "enabled" in step 326, the VSPmode is rechecked for VSP mode equal 1 in step 329 and the power off time is reduced by a decrement, typically five (5) units in step 331 and the process returns to Start.

While the invention has been described in conjunction with preferred embodiments, various changes can be made without departing from the spirit and scope of the invention, as defined in the appended claims in which.

I claim:

1. A wireless data communication system having extended power capability comprising:
  (a) a first station linked to a second station which serves as an access point (AP) to support packet communication, voice or data;
  (b) monitoring apparatus at the access point (AP) which sorts packets according to a Continuously Aware Mode (CAM) or Power Saving Model (PSM) mode; and
  (c) transmitting apparatus which transmits immediately CAM packets to the first station while PSM packets are buffered by the access point (AP) and held until requested by the first station when in a Power Saving Poll (PSP) mode; and
  (d) measuring apparatus at the first station which receives the CAM packets and measures CAM packet arrival time for determining a safe period for turning off the receiver between CAM packets based upon an expected arrival time of the CAM packets.

2. The system of claim 1 wherein the measuring apparatus further comprises:
  (e) "jitter" measuring apparatus which measure "jitter" associated with packet arrival intervals.

3. The system of claim 1 further comprising:
  (f) "sleep" apparatus responsive to the measuring apparatus which awakens the first station for receiving packets based upon the safe period.

4. The system of claim 1 wherein the access point and the first mobile unit operate under the IEEE 802.11 standard.

5. The system of claim 1 further comprising:
  (g) first station comparing apparatus which compares the ith actual packet arrival time [A (i)] to expected packet arrival time (P).

6. The system of claim 5 further comprising:
  (h) first station determining apparatus which determines the state of the PSP mode as "0" or disable or "1", enabled but in trouble, or "2", enabled.

7. The system of claim 6 further comprising:
  (i) first station processing apparatus which operates when AI (i) does not approach P and waits for the next packet if the PSP state is 0 or waits for the next packet if the PSP mode is "1" with no good packet intervals and reduces the "Power Off" time by a slight amount when the PSP mode is 2 or enabled.

8. The system of claim 7 further comprising:
  (j) first station measuring apparatus which determines an extended "Power Off" time between packets as

[P–Standard Deviation of Consecutive Packet Arrival Time AI (i, i+1, i+2) Receiver Stabilizing Time after "Power On"] when in the "0" mode and AI (i) approaches P or if the PSP mode is "1" or "2" waiting for the arrival of the next packet whereupon the "Power Off" mode is extended beyond normal "Power Off" time due to the periodic nature of the voice traffic.

9. A method for extended "Power Off" period for a wireless communication system comprising:
  (a) waiting for continuosly aware mode packet arrival at a mobile unit in the wireless communication system, wherein packets are sorted into continuously aware mode packets and power save mode packets, and whereing the continuously aware mode packets are transmitted immediately by an access point and the power save mode packets are buffered at the access point;
  (b) comparing actual packet time [AI(i)] versus P or expected packet arrival time for continuously aware mode packets;
  (c) determining the status of a PSP mode as "0" or enabled; "1" or in trouble, or "2" enable;
  (d) returning to Step b, if AI (i) does not approach P and the PSP mode is 0 or 1, and reducing the Power Off time, if the PSP mode is 2;
  (e) determining the PSP mode if AI (I) approximates P;
  (f) returning to Step a, if the PSP mode is 1 or 2; and
  (g) calculating an extended Power Off time.

10. The method of claim 9 further comprising the step of:
  (i) reducing the "Power Off" time by a slight amount when the PSP mode is 2 or enabled when AI (i) does not approach P and waits for the next packet if the PSP state is 0 or waits for the next packet if the PSP mode is "1" with no good packet intervals.

11. The method of claim 10 further comprising the step of:
  (h) waiting for the arrival of the next packet AI (i) which approaches P or if the PSP mode is "1" or "2".

12. The method of claim 11 wherein the actual packet arrival time [AI (i)]=Current Arrival Time (CT)–Last Packet Arrival Time (LT) and LT=CT.

13. The method of claim 12 wherein preferably the extended Power Off Time is [P–Standard Deviation (AI (i), AI (i–1), AI (i–2)–Receiver Start Up Time (RSU)] when the PSP is 0, whereby an extended Power Off time is achieved by the periodic nature of the packet arriva time.

14. A computer readable medium with program instructions, executable in a computer system, for extended "Power Off" period for a wireless communication system comprising:
  (a) program instruction for waiting for packet arrival at a mobile unit in the wireless communication system, wherein packets are sorted into continuously aware mode packets and power save mode packets, and wherein the continuously aware mode packets are transmitted immediately by an access point and the power save mode packets are buffered at the access point;
  (b) program instruction for comparing actual packet time [AI(i)] versus P or expected packet arrival time for the continuously aware mode packets;
  (c) program instruction for determining the status of a PSP mode as "0" or enabled; "1" or in trouble, or "2" enable;
  (d) program instruction for returning to Step b, if AI (i) does not approach P and the PSP mode is 0 or 1, and reducing the Power Off time, if the PSP mode is 2;
  (e) program instruction for determining the PSP mode if AI (I) approximates P;
  (f) program instruction for returning to Step a, if the PSP mode is 1 or 2; and
  (g) program instruction for calculating an extended Power Off time.

15. The computer readable medium of claim 14 further comprising the step of:
  (h) program instruction for reducing the "Power Off" time by a slight amount when the PSP mode is 2 or enabled when AI (i) does not approach P and waits for the next packet if the PSP state is 0 or waits for the next packet if the PSP mode is "1" with no good packet intervals.

16. The computer readable medium of claim 15 further comprising the step of:
  (i) program instruction for waiting for the arrival of the next packet AI (i) which approaches P or if the PSP mode is "1" or "2".

17. The computer readable medium of claim 16 wherein the actual packet arrival time [AI (i)]=Current Arrival Time (CT)–Last Packet Arrival Time (LT) and LT=CT.

18. The computer readable medium of claim 17 wherein preferably the extended Power Off Time is [P—Standard Deviation (AI (i), AI (i–1), AI (i–2)–Receiver Start Up Time (RSU)] when the PSP is 0, whereby an extended Power Off time is achieved by the periodic nature of the packet arrival time.

* * * * *